(12) United States Patent
Dillon et al.

(10) Patent No.: US 7,820,132 B2
(45) Date of Patent: Oct. 26, 2010

(54) HOT WIRE PRODUCTION OF SINGLE-WALL AND MULTI-WALL CARBON NANOTUBES

(75) Inventors: Anne C. Dillon, Boulder, CO (US); Archie H. Mahan, Golden, CO (US); Jeffrey L. Alleman, Lakewood, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 1215 days.

(21) Appl. No.: 10/548,924

(22) PCT Filed: Mar. 13, 2003

(86) PCT No.: PCT/US03/07787

§ 371 (c)(1),
(2), (4) Date: Sep. 12, 2005

(87) PCT Pub. No.: WO2004/083502

PCT Pub. Date: Sep. 30, 2004

(65) Prior Publication Data

US 2006/0099136 A1 May 11, 2006

Related U.S. Application Data

(63) Continuation-in-part of application No. PCT/US01/48093, filed on Dec. 14, 2001.

(51) Int. Cl.
*D01F 9/12* (2006.01)
(52) U.S. Cl. .................................. 423/447.3; 977/843
(58) Field of Classification Search .............. 423/447.3; 977/843
See application file for complete search history.

(56) References Cited

U.S. PATENT DOCUMENTS

| 5,358,741 | A | 10/1994 | Gat |
| 5,374,415 | A | 12/1994 | Alig et al. |
| 5,413,866 | A | 5/1995 | Baker et al. |
| 5,424,054 | A | 6/1995 | Bethune et al. |
| 5,510,098 | A | 4/1996 | Chow |
| 5,776,819 | A | 7/1998 | Mahan et al. |
| 6,139,919 | A | 10/2000 | Eklund et al. |
| 6,156,256 | A | 12/2000 | Kennel |
| 6,156,435 | A | 12/2000 | Gleason et al. |
| 6,214,706 | B1 | 4/2001 | Madan et al. |
| 6,221,330 | B1 | 4/2001 | Moy et al. |
| 6,361,861 | B2 | 3/2002 | Gao et al. |
| 6,383,923 | B1 * | 5/2002 | Brown et al. ............ 438/666 |
| 6,495,258 | B1 | 12/2002 | Chen et al. |
| 6,827,919 | B1 | 12/2004 | Moy et al. |
| 6,863,942 | B2 * | 3/2005 | Ren et al. ............ 428/36.9 |
| 2004/0265211 | A1 | 12/2004 | Dillon et al. |

FOREIGN PATENT DOCUMENTS

WO 2003 056078 10/2003

OTHER PUBLICATIONS

Ono, Takahito et al., "Electric-field-enhanced growth of carbon nanotubes for scanning probe microscopy," Institute of Physics Publishing, Nanotechnology 13, (2002) pp. 62-64.
Han, Jae-hee et al., "Growth characteristics of carbon nanotubes by plasma enhanced hot filament chemical vapor deposition," Elsevier, Surface and Coatings Technology 131, (2000) pp. 93-97.
Park, Kyung Ho et al., "Field electron emission from patterned nanostructured carbon films on sodalime glass substrates," J. Vac. Sci. Technol. B 19 (3), (2001) pp. 946-949.
Ren, Z. F., et al., "Synthesis of large arrays of well-aligned carbon nanotubes on glass," Science 282, (1998) pp. 1105-1107.
Chen, Chia-Fu et al., "Hot filament for In Situ catalyst supply in the chemical vapor deposition growth of carbon nanotubes," Jpn. J. Appl. Phys. 41, (2002) pp. 67-69.
Marty, L. et al., "Batch processing of nanometer-scale electrical circuitry based on in-situ grown single-walled carbon nanotubes," Elsevier, Microelectric Engineering 61-62, (2002) pp. 485-489.
International Search Report dated Aug. 11, 2003, for International Application No. PCT/US2003/007787.
International Search Report dated Aug. 30, 2002, for International Application No. PCT/US2001/048093.
International Preliminary Examination Report dated Apr. 20, 2004, for International Application No. PCT/ US2001/048093.
Official Action for U.S. Appl. No. 10/499,211, mailed Jul. 12, 2007, pp. 1-9.
Official Action for U.S. Appl. No. 10/499,211, mailed Nov. 28, 2007, pp. 1-7.
Hess, P., Chemical Vapor Deposition of Crystalline and Amorphous Carbon, Silicon and Germanium Films, Excimer Lasers, pp. 103-119 (1994) Kuwer Academic Pulbishers, Netherlands.

* cited by examiner

*Primary Examiner*—Stuart Hendrickson
(74) *Attorney, Agent, or Firm*—W. LaNelle Owens; Paul J. White; John C. Stolpa

(57) ABSTRACT

Apparatus (210) for producing a multi-wall carbon nanotube (213) may comprise a process chamber (216), a furnace (217) operatively associated with the process chamber (216), and at least one filament (218) positioned within the process chamber (216). At least one power supply (220) operatively associated with the at least one filament (218) heats the at least one filament (218) to a process temperature. A gaseous carbon precursor material (214) operatively associated with the process chamber (216) provides carbon for forming the multi-wall carbon nanotube (213). A metal catalyst material (224) operatively associated with the process (216) catalyzes the formation of the multi-wall carbon nanotube (213).

14 Claims, 8 Drawing Sheets

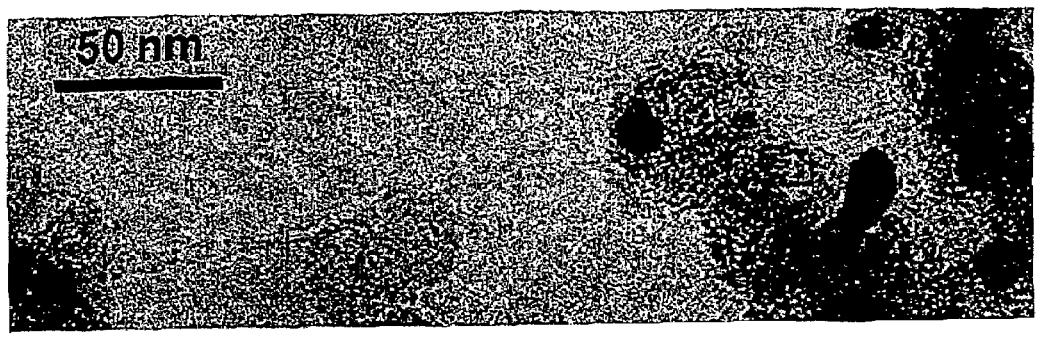
Fig. 2
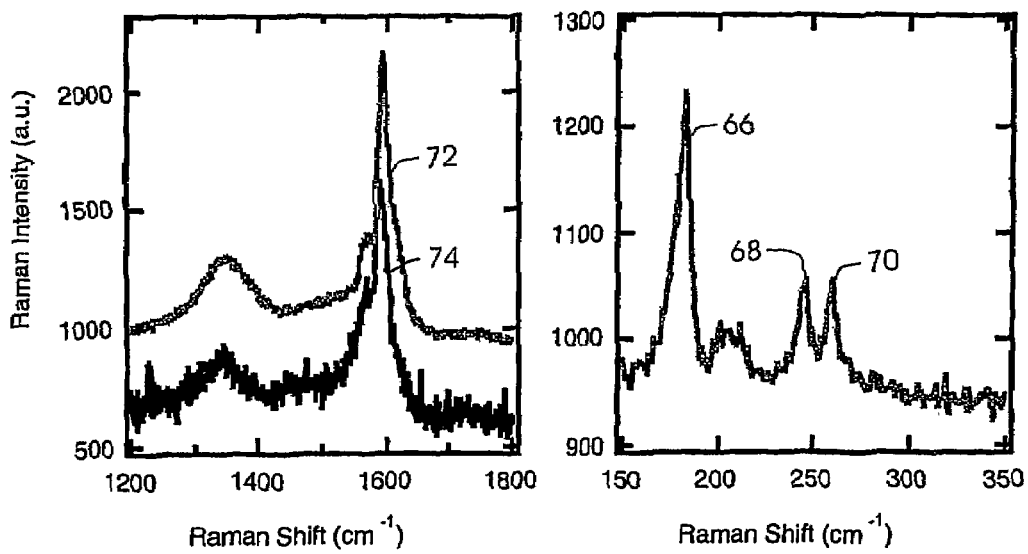
Fig. 3(a)
Fig. 3(b)

HOT WIRE PRODUCTION OF SINGLE-WALL AND MULTI-WALL CARBON NANOTUBES

RELATED APPLICATIONS

This is a continuation-in-part of PCT Patent Application PCT/US01/48093 for "Hot Wire Production of Single-Wall Carbon Nanotubes" by Dillon, et al., filed Dec. 14, 2001, hereby incorporated herein for all that it discloses.

CONTRACTUAL ORIGIN OF THE INVENTION

The United States Government has rights in this invention pursuant to Contract No. DE-AC36-99GO10337 between the U.S. Department of Energy and the Midwest Research Institute.

TECHNICAL FIELD

This invention relates to carbon nanotubes and more specifically to methods and apparatus for producing single-wall and multi-wall carbon nanotubes.

BACKGROUND ART

Both multi-wall carbon nanotubes (MWNTs) and single-wall carbon nanotubes (SWNTs) are well-known in the art. MWNTs generally comprise concentric cylinders with a hollow center and are capped on each end. The cylinders have inner diameters in the range of 2-10 nm and outer diameters in the range of 15-50 nm, and the spacing between each cylinder is similar to the inter-planar spacing of graphite. SWNTs generally comprise single layer tubes or cylinders in which a single layer of carbon is arranged in the form of a linear fullerene. The single layer tubes or cylinders comprising SWNTs generally have diameters in the range of about 1-2 nm. Both MWNTs and SWNTS have lengths on the order of microns, thus making them "high aspect ratio" particles.

Carbon MWNTs and SWNTs have a variety of unique electronic, optical, and mechanical properties that make them promising candidates for a wide range of applications, including, gas storage and separation, fuel cell membranes, batteries, photovoltaic devices, composite materials, electron emission materials for cold-cathode flat panel displays, and nanoscale wires and interconnects, just to name a few. However, before any of these applications can be effectively realized, a process must be developed for producing substantially defect-free and high purity carbon nanotubes quickly and on a large scale.

While several different methods for producing carbon MWNTs and SWNTs have been developed and are being used, none has provided an acceptable balance of high efficiency and low cost while producing substantial quantities of a highly pure, or at least a purifiable, MWNT or SWNT product. For example, arc discharge processes, while generally capable of producing modest quantities of nanotubes, also tend to produce excessive amounts of graphite and graphite encapsulated metals which are difficult to remove without destroying the product as well. Chemical vapor deposition (CVD) processes may also be used to produce modest quantities of nanotubes, but also tend to produce extraneous compounds which must be removed or separated in order to produce a purified product. Additionally, it is generally necessary to remove contamination from the catalyst support material, typically alumina or silica. Generally nanotubes produced by CVD processes are highly defective and therefore very difficult to purify. Laser vaporization methods are also known and have been developed to the point where they can produce relatively high yields of pure or easy to purify SWNTs. However, laser vaporization processes are very expensive and have not proven to be readily scalable to produce larger quantities of SWNTs.

Consequently, a need remains for methods and apparatus for producing MWNTs and SWNTs capable of producing a relatively pure, or at least an easy to purify, product at a relatively low cost. Additional advantages would be realized if such processes were continuous and readily scalable, thereby allowing for the large scale, economical production of a highly pure MWNT and SWNT product.

DISCLOSURE OF INVENTION

A method for producing a carbon nanotube product in accordance with the present invention may include the steps of providing a process chamber having at least one filament therein; introducing a gaseous carbon precursor material into the process chamber; providing a metal catalyst material in the process chamber; and collecting the carbon nanotube product formed in the process chamber.

Apparatus for producing a multi-wall carbon nanotube may comprise a process chamber and a furnace to heat the process chamber. At least one filament is positioned within the process chamber. At least one power supply operatively associated with the at least one filament heats the at least one filament to a process temperature. A gaseous carbon precursor material operatively associated with the process chamber provides carbon for forming the multi-wall carbon nanotube. A metal catalyst material provided in the process chamber catalyzes the formation of the multi-wall carbon nanotube.

BRIEF DESCRIPTION OF THE DRAWINGS

Illustrative and presently preferred embodiments of the invention are shown in the accompanying drawings in which:

FIG. 2 is a transmission electron micrograph of the single-wall carbon nanotube product produced by the method and apparatus of the present invention;

FIG. 3(a) is a Raman spectral profile of the characteristic single-wall nanotube tangential modes for excitation at 488 nm of the product produced by the method and apparatus of the present invention in comparison with nanotubes produced by a conventional arc discharge process;

FIG. 3(b) is a Raman spectral profile of the radial breathing modes for excitation at 488 nm of the single-wall carbon nanotube product produced by the method and apparatus of the present invention indicating that tubes of multiple diameters are produced;

BEST MODES FOR CARRYING OUT THE INVENTION

Figure 1:
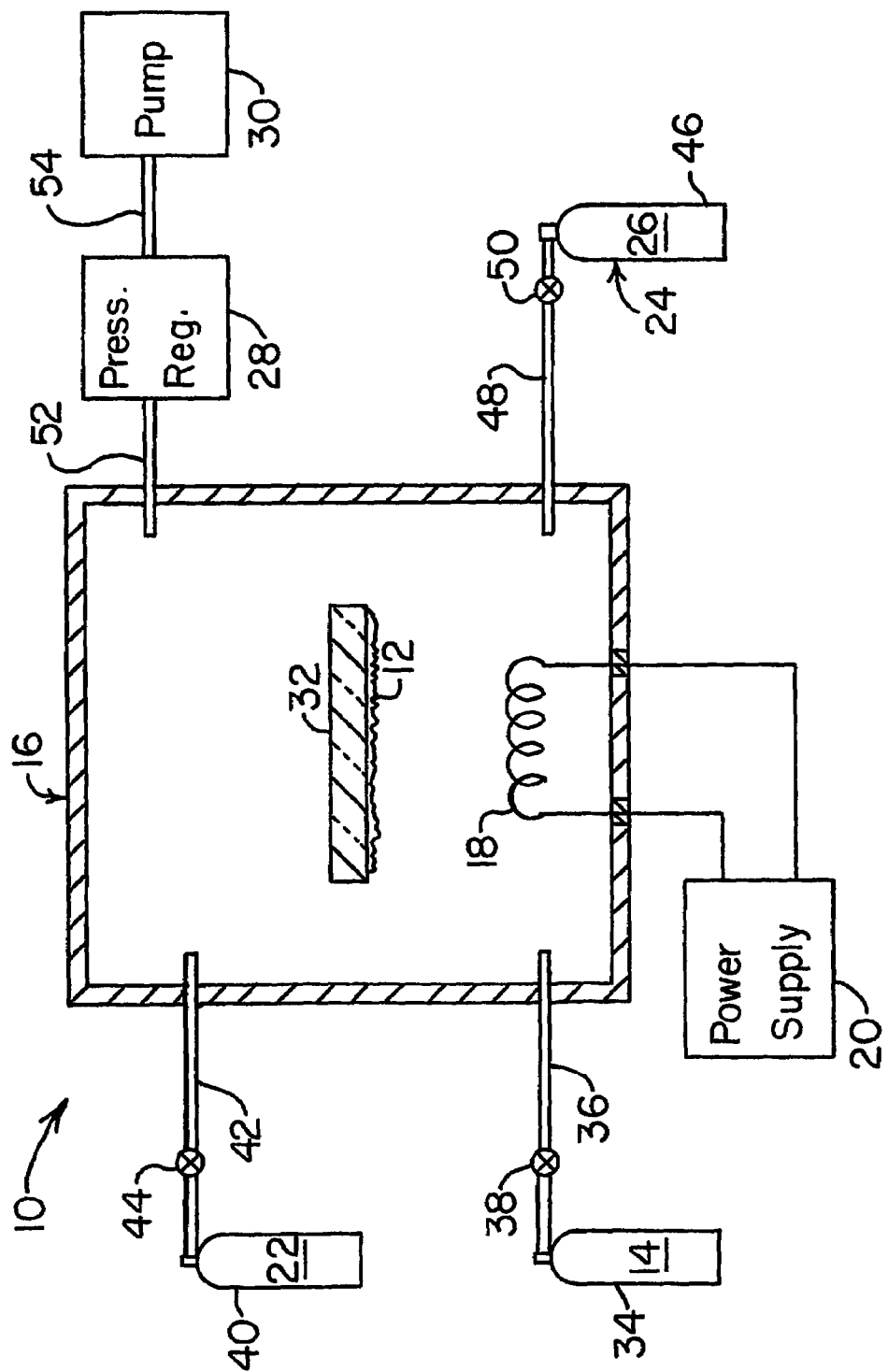
FIG. 1 is a schematic representation of an embodiment of apparatus according to the present invention for producing single-wall or multi-wall carbon nanotubes.

An embodiment 10 of apparatus for producing single-wall or multi-wall carbon nanotubes is shown in FIG. 1 as it may be used to produce carbon nanotube material 12 from a gas phase carbon precursor material 14. Briefly, the apparatus 10 may comprise a process chamber 16 within which is provided a hot wire or filament 18. A power supply 20 connected to the hot wire or filament 18 is used to heat the hot wire 18 to a process temperature sufficient to produce the product 12. Also connected to the process chamber 16 is a supply of the gaseous carbon precursor material 14 and, optionally, a supply of a process enhancement gas 22, such as hydrogen or argon. A metal catalyst 24 is also provided within the process chamber 16. The metal catalyst 24 catalyzes the formation of the product 12. In the embodiment shown in FIG. 1, the metal catalyst 24 may comprise or be contained in a supply of a gas phase organo-metallic compound 26, such as ferrocene, which is fluidically connected to the process chamber 16. This arrangement allows the metal catalyst 24 contained within the gaseous organo-metallic compound 26 to be introduced into the process chamber 16. Alternatively, the metal catalyst 24 may be introduced into the process chamber by other means, as will be described in greater detail below.

The process chamber 16 may also be fluidically connected to a pressure regulator 28 and pump assembly 30 which together may be used to maintain the internal pressure of the process chamber 16 within a predetermined range of process pressures suitable for carrying out the process of the present invention. It is generally preferred, but not required, to also provide the process chamber 16 with a collection substrate 32 upon which collects the product 12. The product 12 may be collected or "harvested" from the collection substrate 32 in a manner that will be described in greater detail below. As will also be described in greater detail below, the collection substrate 32 and/or the entire process chamber 16 may be heated in order to better control the product yield.

Figure 5:
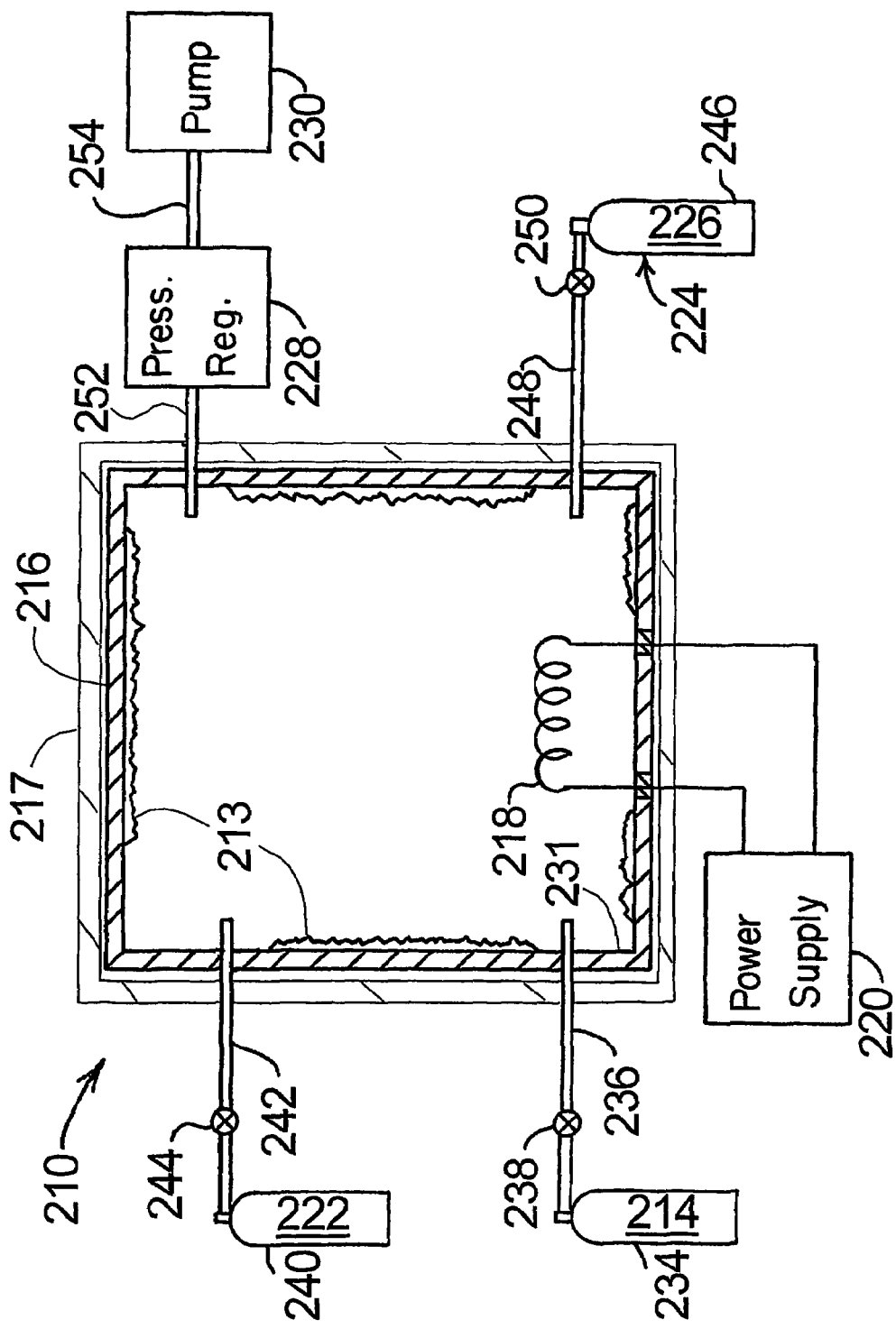
FIG. 5 is a schematic representation of an embodiment of apparatus according to the present invention for producing single-wall or multi-wall carbon nanotubes.

Another embodiment apparatus 210 is shown in FIG. 5 for producing carbon nanotube material 213 from a gas phase carbon precursor material 214. For the convenience of the reader, two-hundred series reference numbers in FIG. 5 correspond to like elements in FIG. 1. It is noted that apparatus 210 differs in some respects from apparatus 10. For instance, apparatus 210 comprises an external furnace 217 and heats the process chamber 216 during operation. In addition, apparatus 210 preferably does not comprise a collection substrate such as that described for apparatus 10. Instead, the product 213 collects on the interior walls 231 of the process chamber 216.

Apparatus 10 may be operated as follows to produce product 12. Assuming that the process chamber 16 and various ancillary equipment and devices have been provided in the manner set forth above, the gaseous carbon precursor material 14 may be introduced into the process chamber 16 at a flow rate commensurate with quantity of the product 12 that is to be produced. The metal catalyst 24 may also be provided at this time to the process chamber 16. In the embodiment shown and described in FIG. 1, the metal catalyst 24 is provided by means of a supply of a gaseous organo-metallic compound 26 (e.g., ferrocene), that is introduced into the process chamber 16, and is preferably provided on a continuous basis during production. The pressure regulator 28 and pump assembly 30 are operated to maintain the pressure inside the process chamber 16 at a pressure commensurate with the efficient formation of large quantities of the product 12. By way of example, in one preferred embodiment, the process pressure may be maintained at a pressure of about 150 torr, although other pressures may be used, as will be described in greater detail below. Next, the power supply 20 is activated to cause an electric current to flow through the filament or hot wire 18. The electric current flowing through the filament or hot wire 18 heats the wire to a process temperature commensurate with the efficient formation of large quantities of the product 12. By way of example, in one preferred embodiment, the power supply 20 maintains the temperature of the hot wire or filament 18 at a temperature of about 2,000° C.

It is generally preferred, but not required, that the process of the present invention be conducted in the presence of hydrogen, which, in one preferred embodiment, is provided by the process enhancement gas supply 22. The addition of hydrogen to the process chamber 16 tends to increase the number of gas phase interactions, thus improving product yield. The hydrogen also substantially reduces graphitization of the hot wire or filament 18. It is believed that the hydrogen may initiate all of the hydrocarbon decomposition.

It should be noted that the foregoing steps could be performed in other sequences since the order of the foregoing steps is not critical in achieving the objects and advantages of the present invention. For example, the power supply 20 could be activated first to heat the hot wire filament 18 before introducing any gases into the process chamber 16. Thereafter, the various gases, e.g., the carbon precursor material 14, the process enhancement gas 22 (if used), and the metal catalyst material 24 (if a gaseous metal catalyst material 24 is to be used) may then be introduced into the process chamber 16. Consequently, the present invention should not be regarded as limited to performing the foregoing steps in any particular order.

If a thermally decomposable process enhancement gas 22 is used, the hot wire 18 may decompose the process enhancement gas 22 and/or the gaseous carbon precursor material 14. The hot wire 18 also vaporizes and/or decomposes the metal catalyst material 24 provided to the process chamber 16, such as for example, via the organo-metallic compound 26 (e.g., ferrocene). The vaporized metallic catalyst 24 causes a substantial portion of the elemental carbon liberated by the decomposition of the carbon precursor material 14 to organize or form into various carbon nanotubes which thereafter collect on the collection substrate 32 as the carbon nanotube material 12. Thereafter, the product 12 may be removed from the substrate 32. It should be noted that in many circumstances, other materials and compounds, such as nano-crystalline graphite and quantities of metallic catalyst (not shown) may also collect on the collection substrate 32. However, such other materials and compounds can be separated from the product 12 by any of a wide range of purification processes that are now known in the art or that may be developed in the future, as will be described in greater detail below.

It is further noted that apparatus 210 for producing carbon nanotubes may be operated in a similar manner, as will be described in more detail below with specific regard to the process parameters for producing multi-wall carbon nanotube product 213.

Figure 6A:
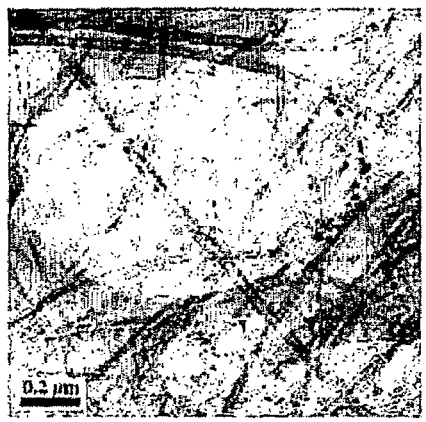
FIGS. 6(a)-(e) are transmission electron micrographs of the multi-wall carbon nanotube product produced by the method and apparatus of the present invention.
Figure 6B:
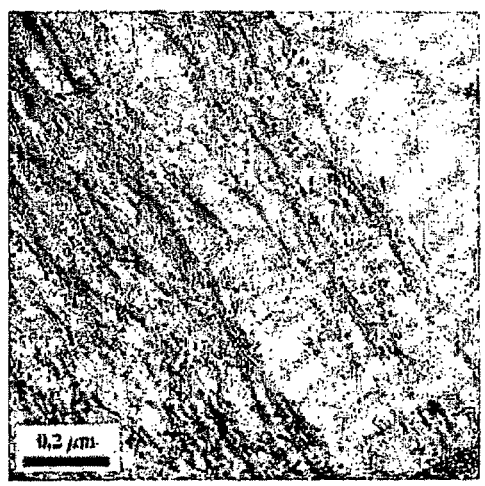
Figure 6C:
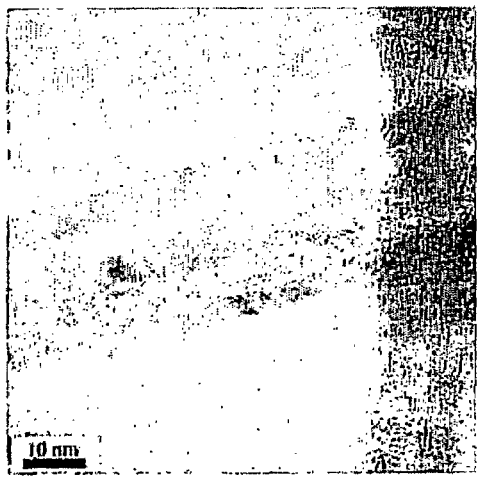
Figure 6D:
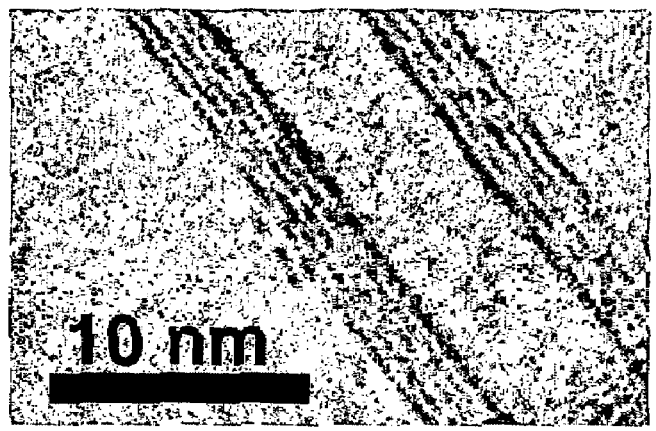
Figure 6E:
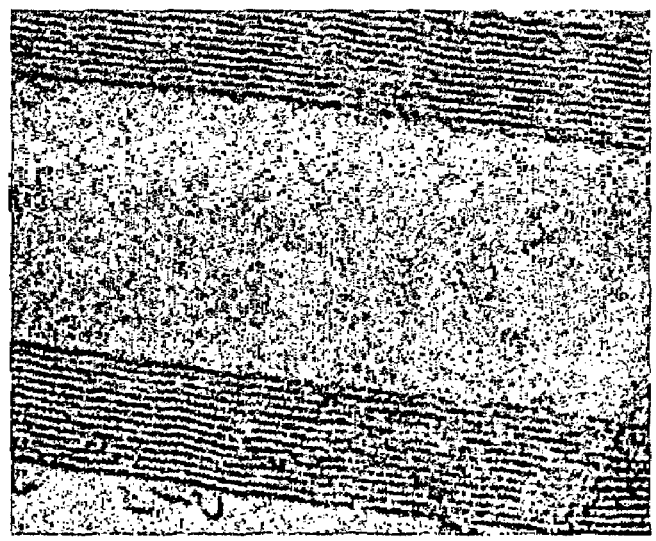

The product produced according to the methods and apparatus of the present invention may be imaged in accordance with any of a wide range of microscopy processes that are now known in the art or that may be developed in the future that are suitable for imaging particles in the nano-size range. For example, FIG. 2 is an image of the single-wall carbon nanotube material produced by a transmission electron microscope in a process generically referred to as transmission electron microscopy (TEM). As is readily seen in the TEM image illustrated in FIG. 2, individual single-wall carbon nanotube comprises a generally cylindrically shaped, rod-like configuration having a high aspect ratio. That is, the mean length of the nanotube is several orders of magnitude greater than the mean diameter of the nanotube. Significantly, the TEM imaging of the single-wall carbon nanotube material also indicates that the nanotubes are generally separated or isolated from one another, thereby indicating that the apparatus and method of the present invention may be used advantageously to produce "unbundled" single-walled carbon nanotubes. TEM images for multi-wall carbon nanotube product 213 are also shown in FIGS. 6(a)-(c) and will be described in more detail below.

Raman spectroscopy may also be used to ascertain certain properties of the single-wall carbon nanotube material. Raman spectroscopy is an established analytical technique that provides highly accurate and definitive results. For example, Raman spectroscopy methods may be used to determine the distribution of individual tube diameters produced by the method and apparatus of the present invention since the frequencies of the radial "breathing modes" are strongly diameter dependent. Raman spectroscopy methods may also be used to determine the relative proportions of semiconducting and metallic single-wall nanotubes. Semiconducting tubes typically resonate at about 488 nm while metallic single-wall nanotubes often resonate at about 633 nm. For example, and with reference now to FIG. 3a, Raman spectra collected at 488 nm indicate the formation of a greater number of semiconducting tubes with the method and apparatus of the present invention (curve 72) compared with nanotubes produced by conventional arc discharge methods (curve 74). FIG. 3b illustrates the Raman spectra collected at 488 nm which reveal the radial "breathing modes" of the single-wall carbon nanotube material produced by the method and apparatus of the present invention. The Raman spectra of FIG. 3b include several distinct peaks 66, 68, and 70 which are indicative of collections of nanotubes having different diameters.

Figure 9:
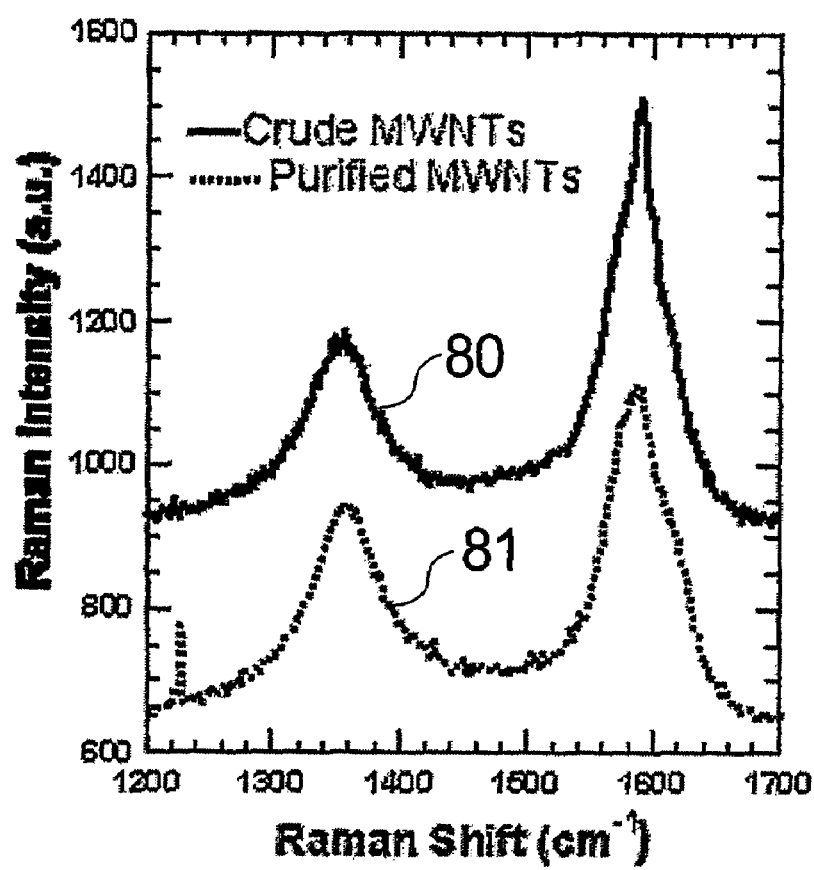
FIG. 9 is a Raman spectral profile of the multi-wall carbon nanotube product produced by the method and apparatus of the present invention indicating the purity and/or graphitized nature of the nanotubes that are produced.

Raman spectroscopy was also used to evaluate the multi-wall carbon nanotubes. FIG. 9 shows the Raman spectra for multi-wall carbon nanotubes produced according to the teachings of the invention before purification by curve 80 and after purification by curve 81. The D-band/G-band intensity (D/G) ratio in the spectrum of the as-produced multi-wall carbon nanotubes is ~0.40 indicating that these are more completely graphitized and/or contain fewer carbon impurities than conventionally-generated multi-wall carbon nanotubes where the D/G ratio is typically about 1.0. Although the D/G ratio increases to ~0.55 for the purified multi-wall carbon nanotubes, this is consistent with the introduction of a small number of defects caused by the purification process.

A significant advantage of the methods and apparatus according to the present invention is that they may be used to produce single-wall carbon nanotubes or multi-wall carbon nanotubes on a continuous basis, thereby providing for production efficiencies over batch-type processes. The present invention is also scalable. Accordingly, large, i.e., high capacity process chambers, may be used to efficiently produce large quantities of single-wall carbon nanotube material or multi-wall carbon nanotubes on a continuous basis. Another significant advantage is that the single-wall carbon nanotubes may appear as separate, as opposed to "bundled" or agglomerated, elements, thereby providing a means for producing large quantities of "unbundled" nanotubes, which may have significant utility. Alternatively, a bundled nanotube product may also be produced, as will be described below.

Still other advantages are associated with the gaseous phase carbon precursor material 14. For example, the gaseous phase carbon precursor material 14 simplifies the provision of the carbon precursor material 14 to the process chamber, enhances the ability of the hot wire or filament 18 to produce the product 12, and also enhances mixing with the metal catalyst material 24 also contained within the process chamber 16. The provision of both the carbon precursor material 14 and the metal catalyst material 24 in the gaseous phase also allows the carbon precursor material 14 and metal catalyst material 24 to be more easily provided to the chamber 16 on a continuous basis, thereby more easily allowing the apparatus 10 to be operated on a continuous basis.

Having briefly described methods and apparatus for producing carbon nanotube product according to the present invention, as well as some of the more significant advantages associated therewith, the various embodiments of the present invention will now be described in greater detail below.

Referring back now to FIG. 1, one embodiment 10 of apparatus for producing s carbon nanotube material 12 from a gas phase carbon precursor material 14 may comprise a process chamber 16 within which is provided a hot wire or filament 18. The process chamber 16 may comprise any of a wide variety of configurations and sizes depending on the amount, i.e., quantity of carbon nanotube material 12 that is to be produced. For example, in the embodiment shown and described herein, the process chamber 16 may comprise a generally cylindrically shaped structure sized to contain the various devices and to operate in conjunction with the various systems shown and described herein. The process chamber 16 may be fabricated from stainless steel, although other materials (e.g., quartz) may also be used, as would be obvious to persons having ordinary skill in the art. Alternatively, of course, the process chamber 16 may comprise other configurations and may be fabricated from other materials depending on the requirements of the particular application, as would be obvious to persons having ordinary skill in the art after having become familiar with the teachings of the present invention. Consequently, the present invention should not be regarded as limited to process chambers having any particular configuration and fabricated from any particular material. Moreover, since suitable configurations for the process chamber 16 may be easily arrived at by persons having ordinary skill in the art after considering the requirements of the particular application and after having become familiar with the teachings contained herein, the process chamber 16 that may be utilized in one preferred embodiment will not be described in further detail herein.

As was briefly mentioned above, the carbon precursor material 14 required to form the carbon nanotube material 12 is preferably provided in a gaseous phase. As mentioned above, the provision of the carbon precursor material 14 in a gaseous phase provides several advantages. For example, the gaseous phase carbon precursor material 14 simplifies the provision of the carbon precursor material 14 to the process chamber, enhances the ability of the hot wire or filament 18 to produce the carbon nanotube material 12, and also enhances mixing with the metal catalyst material 24 also contained within the process chamber 16. The provision of the carbon precursor material 14 in the gaseous phase also allows the carbon precursor material 14 to be more easily provided to the chamber 16 on a continuous basis, thereby more easily allowing the apparatus 10 to be operated on a continuous basis.

The carbon precursor material 14 may comprise any of a wide range of carbon-containing materials and compounds from which the carbon atoms may be readily decomposed or separated upon contact with the hot filament 18. Examples of carbon precursor materials 14 include, but are not limited to, methane, acetylene, and benzene. In another example, the carbon precursor material 14 may be produced by the vaporization of solid carbon. Alternatively, other materials may also be used, as would be obvious to persons having ordinary skill in the art after having become familiar with the teachings of the present invention.

The gaseous carbon precursor material 14 may be contained in a reservoir 34 that is in fluid communication with the process chamber 16 via a suitable gas conduit 36. A mass flow controller or valve 38 operatively associated with the gas conduit 36 and positioned between the reservoir 34 and the process chamber 16 may be used to control the flow of the carbon precursor material 14 into the process chamber 16. Alternatively, however, other configurations and devices for introducing the gaseous carbon precursor material 14 into the process chamber 16 may be used, as would be obvious to persons having ordinary skill in the art after having become familiar with the teachings of the present invention. Consequently, the present invention should not be regarded as limited to any particular type of system comprising any particular components for delivering to the process chamber 16 the gaseous phase carbon precursor material 14.

The hot wire or filament 18 may be mounted at any convenient location within the process chamber 16 by any of a wide range of mounting systems (not shown) now known in the art or that may be developed in the future that are suitable for holding hot filaments. The hot wire or filament may be fabricated from any of a wide range of materials that would be suitable for the intended application. For example, in one preferred embodiment, the hot wire or filament 18 is fabricated from tungsten. Alternatively, the hot wire or filament 18 may be manufactured from other materials. For example, in an alternative embodiment, the hot wire or filament 18 could be manufactured from a metal catalyst material suitable for catalyzing the formation of the carbon nanotubes. As will be discussed in greater detail below, suitable transition metal catalysts include, but are not limited to, Fe, Co, Ni, Mo, Pd, and Rh, and alloys thereof. In still another alternative, the filament 18 may be "doped" with a suitable metal catalyst material before being placed within the process chamber 16. Such doping of the filament 18 with a suitable metal catalyst material provides an alternate means for supplying the metal catalyst within the process chamber 16 to allow catalysis of the carbon nanotube material 12.

Another consideration for the filament 18 is that it be capable of being operated at the required process temperature, preferably for a significant time span. The relatively high filament temperatures involved (e.g., about 2000° C.), may limit the main filament to materials capable of being operated at such temperatures, such as tungsten and various alloys thereof. In addition, more than one filament may be provided for decomposing the precursor material and/or supplying metal catalyst material. For example, filaments having different metals may be used.

The filament 18 is connected to a power supply 20 which provides the energy required (i.e., via electric resistance heating) to heat the filament 18 to the required process temperature. Accordingly, the power supply 20 may comprise any of a wide range of types (e.g., DC or AC power supplies) having any of a wide range of power outputs that would be suitable for the intended application. Consequently, the present invention should not be regarded as limited to any particular type of power supply having any particular power capacity or output. However, by way of example, in one preferred embodiment, the power supply 20 comprises an AC type power supply capable of providing a current of about 25 amperes at a voltage of about 20 volts. As will be discussed in greater detail below, supplying the filament 18 in one preferred embodiment with this voltage and current results in a filament temperature of about 2000° C. More than one power supply may be required if the apparatus has more than one filament. Of course, larger power supplies will be required if the apparatus is to have increased production capacity, as would be obvious to persons having ordinary skill in the art after having become familiar with the teachings of the present invention.

It is generally preferred, but not required, that the process chamber 16 also be provided with a supply of a process enhancement gas 22, such as hydrogen. As was briefly mentioned above, providing the hydrogen process enhancement gas to the process chamber 16 tends to increase the number of gas phase interactions and precursor decomposition, thereby increasing product yield. The presence in the process chamber 16 of additional amounts of hydrogen may also significantly reduce graphitization of the hot wire or filament 18. The process enhancement gas 22 may be provided to the process chamber 16 by any of a wide range of delivery systems that are now known in the art or that may be developed in the future, as would be obvious to persons having ordinary skill in the art after having become familiar with the teachings of the present invention. Consequently, the present invention should not be regarded as limited to any particular type of system having any particular components for delivering the process enhancement gas 22 to the process chamber 16. However, by way of example, in one preferred embodiment, the process enhancement gas 22 may be contained in a reservoir 40 that is fluidically connected to the process chamber 16 via gas conduit 42. A valve 44 located in the gas conduit 42 and positioned between the reservoir 40 and process chamber 16 may be used to regulate the flow of the process enhancement gas 22 into the process chamber 16.

The metal catalyst material 24 may comprise any of a wide variety of forms and may be introduced into the process chamber 16 by any of a wide variety of ways. For example, in the embodiment shown in FIG. 1, the metal catalyst material 24 comprises or may be contained within a gas phase organo-metallic compound 26. In the embodiment shown in FIG. 1, the gas phase organo-metallic compound 26 may be contained in a reservoir 46 that is fluidically connected to the process chamber 16 via a suitable gas conduit 48. If the organo-metallic compound 26 is in solid form in reservoir 46, reservoir 46 may be heated to convert the solid material into gas phase. A valve 50 operatively associated with the gas conduit 48 and positioned between the reservoir 46 and the process chamber 16 may be used to regulate the flow of the gas phase organo-metallic compound 26 into the process chamber 16. Alternatively, the gas phase organo-metallic compound 26 may be provided to the process chamber 16 by any of a wide range of gas delivery systems that are now known in the art or that may be developed in the future suitable for the particular material involved. Accordingly, the present invention should not be regarded as limited to any particular type of delivery system for the gas phase organo-metallic compound 26.

The gas phase organo-metallic compound 26 contains the metal catalyst material 24 and may comprise any of a wide range of materials and compounds that are now known in the art or that may be developed in the future that would be suitable for providing to the process chamber 16 the desired metal catalyst material 24. As mentioned above, suitable transition metal catalysts include, but not limited to, Fe, Co, Ni, Mo, Pd, and Rh. Accordingly, any of a wide range of organo-metallic compounds containing these transition metals may be used, as would be obvious to persons having ordinary skill in the art after having become familiar with the teachings of the present invention. Examples of suitable organo-metallic compounds 26 include, but are not limited to, ferrocene (Fe $(C_5H_5)_2$) and cobalt hexacarbonyl ($Co(CO)_6$). In addition, cobalt benzoate ($Co(OOCC_6H_5)_2$, molybdenum isopropoxide $Mo[OCH(CH_3)_2]_5$, or the direct vaporization of solid metals may also be used.

The apparatus 10 for producing carbon nanotubes is also provided with a pressure regulator 28 and a pump system 30 that are fluidically connected in series to the interior of the process chamber 16 via suitable gas conduit members 52 and 54, respectively. The arrangement is such that the pressure regulator 28 and pump system 30 may be set to maintain the internal pressure of the process chamber 16 at a process pressure or within a range of process pressures suitable for carrying out the method of the present invention. The pressure regulator 28 and pump system 30 may comprise any of a wide variety of types that are now known in the art or that may be developed in the future having capacities sufficient for the intended application. Alternatively, other configurations comprising other devices may be used to ensure that the internal pressure of the process chamber 16 is maintained within the desired range, as would be obvious to persons having ordinary skill in the art after having become familiar with the teachings of the present invention. Consequently, the present invention should not be regarded to any particular type of system or configuration for maintaining the pressure of the process chamber 16 within the desired range. Moreover, since such regulators 28 and pump systems 30 are well-known in the art and could be easily provided by persons having ordinary skill in the art after having become familiar with the teachings of the present invention, the particular pressure regulator 28 and pump system 30 that may be utilized in the present invention will not be described in further detail herein.

It is generally preferred, but not required, to provide within the process chamber 16 a collection substrate 32. The collection substrate 32 provides a convenient means for removing the carbon nanotube product 12 from the process chamber 16. In the embodiment shown in FIG. 1, the collection substrate 32 may comprise a generally flat, plate-like member positioned within the process chamber 16 so that it is generally adjacent the hot filament 18. During operation, the carbon nanotube material 12 tends to collect on the collection substrate 32 which can then be removed from time to time to remove the accumulated carbon nanotube material 12. The collection substrate 32 may be fabricated from any of a wide range of materials, such as metals or glasses, that would be suitable for the intended application. Consequently, the present invention should not be regarded as limited to collection substrates 32 fabricated from any particular material. By way of example, in the embodiment shown and described herein, the collection substrate 32 is fabricated from Corning 1737 glass.

Apparatus 10 may be operated in accordance with the following methods to produce carbon nanotube material 12. As a first step in the process, the gaseous carbon precursor material 14 may be introduced into the process chamber 16 at a flow rate that is commensurate with size, i.e., capacity, of the apparatus 10 and the quantity of the nanotube material 12 that is to be produced. The metal catalyst 24 may also be provided at this time to the process chamber 16 by means of the supply of gaseous organo-metallic compound 26 (e.g., ferrocene). The pressure regulator 28 and pump assembly 30 are operated to maintain the pressure inside the process chamber 16 at a pressure in the range of about 1 torr to about 750 torr (150 torr preferred) which pressure is commensurate with the efficient formation of large quantities of the carbon nanotube material 12. The power supply 20 is then activated to cause an electric current to flow through the filament or hot wire 18. Alternatively, of course, the power supply 20 may be activated at any time, e.g., either before, during, or some time after the introduction of the carbon precursor material 14. The electric current flowing through the filament or hot wire 18 heats the wire to a filament temperature in the range of about 1500° C. to about 2500° C. (2,000° C. preferred), the temperature commensurate with the efficient formation of large quantities of the carbon nanotube material 12.

As was briefly described above, it is generally preferred, but not required, that the process and method of the present invention be conducted in the presence of hydrogen, which, in the embodiment shown in FIG. 1, is provided by the process enhancement gas supply 22. The presence of hydrogen in the process chamber 16 tends to increase the number of gas phase interactions and decomposition, and substantially reduces graphitization of the hot wire or filament 18. The process enhancement gas 22 may be provided in any of a wide range of ratios with the gaseous carbon precursor material 14. By way of example, in one preferred embodiment wherein the gaseous carbon precursor material 14 comprises methane, hydrogen is provided in a ratio of 1:5 (on a partial pressure basis). That is, the gaseous carbon precursor material 14 and process enhancement gas 22 are introduced into the process chamber 16 so that the partial pressure of the process enhancement gas 22 (e.g., hydrogen) is about five (5) times the partial pressure of the gaseous carbon precursor material 14 (e.g., methane). Alternatively, other pressure ratios may also be used.

The hot wire filament 18 decomposes a combination of the process enhancement gas 22 (if used) and the gaseous carbon precursor material 14, resulting in the formation in the process chamber 16 of elemental carbon (not shown). The hot wire 18 also vaporizes the metallic catalyst 24 provided to the process chamber 16, such as for example, via the organo-metallic compound 26 (e.g., ferrocene). The vaporized metallic catalyst 24 causes a substantial portion of the elemental carbon to form into carbon nanotube material 12, which thereafter collects on the collection substrate 32. Of course, other materials and compounds, such as nano-crystalline graphite, and quantities of the metallic catalyst (not shown) may also collect on the collection substrate 32. Such other materials and compounds can be separated from the carbon nanotube material 12 by any of a wide range of purification processes that are now known in the art or that may be developed in the future. For example, such other materials and compounds may be removed by utilizing a dilute nitric acid reflux technique and air oxidization. Ultrasonic techniques may also be used, either in addition to or in place of the acid reflux technique. However, since techniques for purifying carbon nanotube material are well-known in the art and do not comprise a part of this invention, the particular purification techniques that may be used to purify the carbon nanotube material 12 produced in accordance with the present invention will not be described in further detail herein.

The carbon nanotube material 12 produced according to the method and apparatus of the present invention is shown in FIG. 2 which is an image of the single-wall carbon nanotube material 12 produced by a transmission electron microscope in a process generically referred to as transmission electron microscopy (TEM). As is readily seen in the TEM image illustrated in FIG. 2, an individual single-wall carbon nanotube 12 comprises a generally cylindrically shaped, rod-like configuration having a high aspect ratio. That is, the mean length of the nanotube 12 is several orders of magnitude greater than the mean diameter of the nanotube 12. The TEM image of FIG. 2 also reveals the existence of an isolated or separate single-wall carbon nanotube, thereby indicating that the method and apparatus of the present invention may be used to produce "unbundled" single-wall carbon nanotubes, something that has been difficult to achieve with prior art processes and apparatus. It is believed that the unbundled nature of the nanotube product is a result of the electric charge imposed on the nanotubes during formation by the electron flux emitted by the hot filament. Accordingly, a more conventional "bundled" nanotube product may be produced by dissipating the electric charges on the nanotubes, such as, for example, by utilizing an electrically conductive collection substrate.

Raman spectroscopy may also be used to ascertain certain properties of the single-wall carbon nanotube material 12. Raman spectroscopy is an established analytical technique that provides highly accurate and definitive results. For example, Raman spectroscopy methods may be used to determine the relative proportions of semiconducting and metallic single-wall nanotubes 12. Since semiconducting tubes typically resonate at about 488 nm while metallic single-wall nanotubes often resonate at about 633 nm, Raman spectra taken at various frequencies may be used to determine the relative proportions of semiconducting and metallic nanotubes. For example, and with reference now to FIG. 3a, Raman spectra collected at 488 nm indicate the formation of a greater number of semiconducting tubes with the method and apparatus of the present invention (curve 72) compared with nanotubes produced by conventional arc discharge methods (curve 74).

Raman spectroscopy may also be used to ascertain the distribution of individual tube diameters produced by the method and apparatus of the present invention since the frequencies of the radial "breathing modes" are strongly diameter dependent. For example, FIG. 3b illustrates the Raman spectra collected at 488 which reveal the radial "breathing modes" of the single-wall carbon nanotube material 12 produced by the method and apparatus of the present invention. The Raman spectra of FIG. 3b include several distinct peaks 66, 68, and 70 which are indicative of collections of nanotubes having different diameters.

It is generally preferred, but not required, to heat the collection substrate 32. By way of example, in one preferred embodiment, the collection substrate 32 is heated to a temperature of about 450° C. However, it is generally preferred to provide a "hot zone" (not shown) within the process chamber 16 to enhance the reactions occurring in the chamber 16. In one preferred embodiment, the hot zone is provided nearby the hot filament 18. Alternatively, a separate source, such as an external furnace (not shown in FIG. 1, see for example furnace 217 in FIG. 5) may be used to heat the entire process chamber 16 to a temperature in the range of about 400° C. to about 1200° C., and preferably in the lower end of this range. In addition, an inert carrier gas, such as Ar or He may be used to assist in the transport of the carbon and organo-metallic precursor materials.

Figure 4:
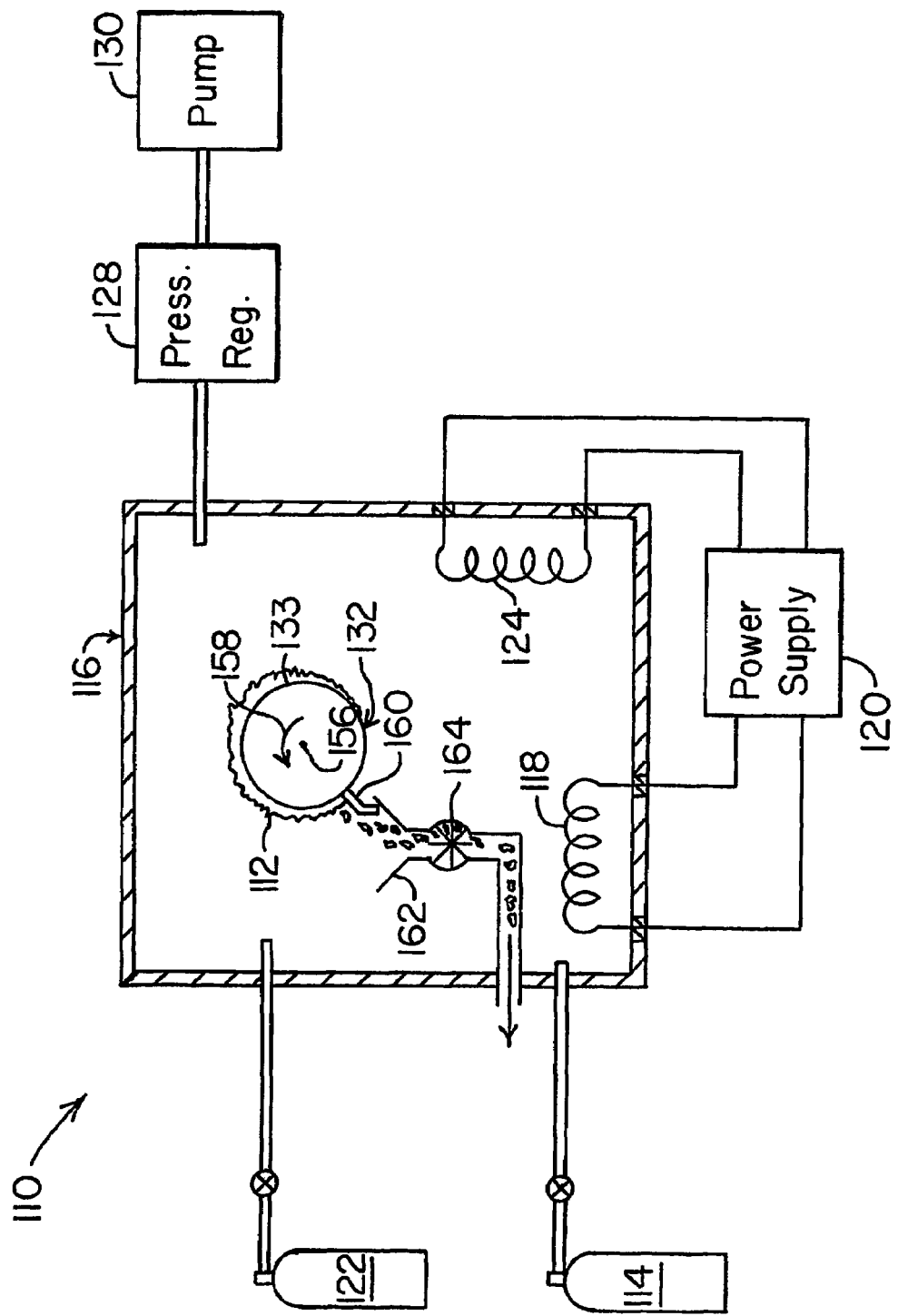
FIG. 4 is a schematic diagram of another embodiment of apparatus according to the present invention for producing single-wall or multi-wall carbon nanotubes.

Another embodiment 110 of the apparatus for producing carbon nanotube material 112 is shown in FIG. 4 and is optimized for the continuous production and collection of the carbon nanotube material 112. One-hundred series reference numbers are used to refer to like elements.

Embodiment 110 also utilizes a separate hot wire catalyst filament 124, rather than or in addition to relying on a separate, gas phase organo-metallic compound. Apparatus 110 may comprise a process chamber 116 within which is positioned a hot wire or filament 118 as well as the hot wire catalyst filament 124. The hot wire 118 may be connected to an electric power supply 120 which provides the energy required to heat the hot wire 118 to the desired process temperature. The hot wire catalyst filament 124 may also be connected to the power supply 120. The process chamber 116 may be provided with a supply of gaseous carbon source material 114 as well as a supply of a process enhancing gas 122 in the manner already described for the first embodiment 10. Likewise, the process chamber 116 may also be in fluid communication with a pressure regulator 128 and a pump system 130 in the manner described above for the first embodiment 10. The pressure regulator 128 and pump system 130 may be used to maintain the internal pressure of the chamber 116 within the desired process pressure range.

As its designation implies, the hot wire catalyst filament 124 provides the metal catalyst material to the process chamber 116 so that it is available to catalyze the formation of the carbon nanotube material 112. As such, the hot wire catalyst filament 124 should include at least the desired metal catalyst in a form suitable for allowing the hot wire catalyst filament 124 to vaporize the metal catalyst, thus releasing the same to the interior of the process chamber. Since, as mentioned above, the metal catalyst material should comprise one of the transition metals (e.g., Fe, Ni, Co, Mo, Pd, and Rh), the hot wire catalyst filament 124 should contain one or more of these elements. The filament 124 may be fabricated from the pure form of the desired metal catalyst, or some alloy thereof. Alternatively, the filament 124 may be "doped" with the desired metal catalyst material. A combination of metal catalysts may be used. For example, catalysts comprising Co:Ni or Fe:Mo have been shown to increase yield of the carbon nanotube material. The desired metal catalyst is released from the hot wire catalyst filament 124 by heating the filament to a temperature sufficient to release or "boil off" a sufficient quantity of metal catalyst material. In one preferred embodiment, the metal catalyst filament 124 is connected to the power supply 120. The power supply 120 causes a current to flow through the catalyst wire 124 which causes the temperature of the filament 124 to increase by electric resistance heating. Alternatively, of course, a separate power supply may be used for the metal catalyst filament 124.

The hot wire metal catalyst filament 124 may be fabricated in accordance with any of a wide range of processes suitable for producing a filament 124 suitable for operation in the above-described manner. However, since processes and methods are known for fabricating filaments containing these elements, the particular process and method that may be used for fabricating the metal catalyst filament will not be described in greater detail herein. In addition, more than one catalyst filaments may be used simultaneously and/or may include an organometallic precursor, as previously discussed.

Embodiment 110 of the apparatus for producing carbon nanotube material 112 may be provided with a collection substrate 132 configured to allow the carbon nanotube material 112 to be collected or "harvested" on a continuous basis. In the embodiment shown in FIG. 4, the collection substrate 132 may comprise a rotating drum or cylinder 133 mounted for rotation about axis 156. A drive system (not shown) may be used to rotate the cylinder 133 about the axis 156 in the direction generally indicated by arrow 158. A scraper 160 positioned in contact with the surface of the rotating collection substrate 132 scrapes off the accumulated carbon nanotube material 112, allowing the same to fall onto a product collector 162. An airlock 164 operatively associated with the product collector 162 allows the harvested carbon nanotube material 112 to be transferred to a collection point outside the process chamber 116.

Yet another embodiment of apparatus 210 is shown in FIG. 5, as it may be used to produce carbon nanotube product 213 from a gas phase carbon precursor material 214. It is noted that for the convenience of the reader, two-hundred series reference numbers designate like elements as those shown and described for apparatus 10 in FIG. 1. Preferably, apparatus 210 comprises a furnace 217 for heating the process chamber 216 and maintaining it in the desired temperature range. By way of example, the process chamber 216 may comprise a quartz tube reactor enclosed in a clamshell furnace 217, although other embodiments are also contemplated as being within the scope of the present invention as will become readily apparent to one skilled in the art after having an understanding of the teachings of the present invention. During operation, carbon nanotube product 213 is produced and collects on the interior walls 231 of the process chamber 216. The product 213 can then be removed from the interior walls 231.

More specifically, a tungsten filament operating at about 20 Amps and 20 Volts may be heated to about 2000° C. Methane (i.e., a carbon precursor material) may be introduced into an argon atmosphere in the process chamber 216 at a ratio of about 1:5 $CH_4$:Ar. Gas phase ferrocene (i.e., an Fe catalyst source) may be introduced into the process chamber 216 at a rate of about 10 to 25 mg/hr. The furnace 217 preferably maintains the interior walls 231 of the process chamber 216 in a temperature range of about 400° C. to 600° C. The process chamber 216 is maintained at a pressure of about 150 torr. The carbon nanotube product is formed in the process chamber 216 and collects on the interior walls 213 of the process chamber 216.

The carbon nanotube product 213 produced according to the methods of the present invention can be observed using TEM imaging. FIG. 6(*a*) is a TEM image showing multi-wall carbon nanotube product. The multi-wall carbon nanotube product is observed to contain about 5-20 concentric shells with inner tube diameters of about 6-15 nm and outer tube diameters of about 10-20 nm. The distance between consecutive carbon shells measures about 0.34 nm. Iron particles of about 10-20 nm in diameter are also apparent.

TGA analysis of the multi-wall carbon nanotubes before purification indicates a slight initial increase consistent with oxidation of the iron catalyst particles or the formation of oxygen containing species on the carbon impurities. The first weight loss occurs at about 450° C. and is consistent with the oxidation of the less stable carbon impurities. Oxidation of the multi-wall carbon nanotubes is maximized at about 615° C., with a material fraction of about 35 wt % remaining. The un-oxidized fraction is consistent with about 27 wt % iron in the crude nanotube soot. TGA analysis of iron particles shows that $Fe_2O_3$ is also formed.

The multi-wall carbon nanotube product may be readily purified to greater than 99 wt % without compromising the tube structure, for example, using a nitric acid reflux procedure. Such a procedure removes most, if not all, of the carbon impurities and residual metal catalyst. The purified multi-wall carbon nanotube product may be recovered from the acidic solution by filtration, rinsed, and dried.

TEM images of the purified product show mats or layers of highly pure multi-wall carbon nanotubes having inner tube diameters of about 4-10 nm and outer tube diameters of about 6-30 nm. See FIGS. 6(*b*) through 6(*e*). Note that the iron particles observed in FIG. 6(*a*) have been removed.

The purified multi-wall carbon nanotubes are recovered with about a 50 wt % to 75 wt % yield. The resulting purified multi-wall carbon nanotubes decompose completely in a single phase with the maximum oxidation occurring at 649° C. A remaining weight fraction is not detected, indicating that the nanotubes are more than 99 wt % pure. High-resolution TEM indicates that the graphitic structure of the tubes is not altered by the purification process.

It is noted that changes to the operational parameters may result in production of fewer carbon nanotubes and/or the production of impurities. Specifically, as the furnace temperature decreases, nano-crystalline graphite and/or amorphous carbon are produced. When the furnace temperature is increased, production shifts to larger non-nanotube graphitic structures. For example, at temperatures of 850° C., micron-sized graphitic particles, sheets and onions are produced.

Figure 7A:
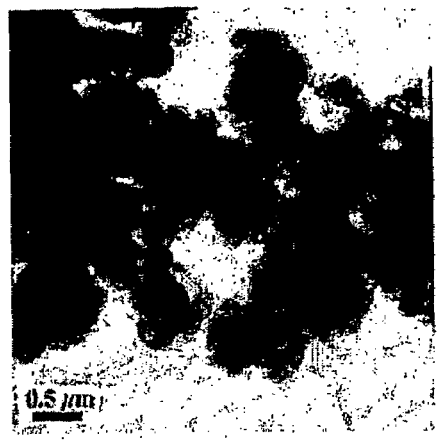
FIGS. 7(a) and 7(b) are transmission electron micrographs of the multi-wall carbon nanotube product produced at different temperatures.
Figure 7B:
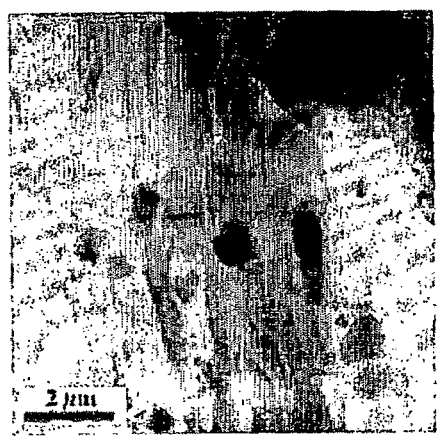

The effects of changes in temperature in the process chamber on the production of multi-wall carbon nanotubes can be observed in TEM images of the product. FIG. 7(*a*) is a TEM image showing primarily amorphous carbon produced with the process chamber 216 operating at room temperature. FIG. 7(*b*) is a TEM image showing large graphitic particles produced with the process chamber 216 operating at temperatures exceeding 800° C.

The effect of temperature on the production of multi-wall carbon nanotubes may be a result of thermodynamics. That is, small carbon particles are predicted to be less stable than carbon nanotubes with tube diameters greater than 0.4 nm and are observed at higher density for lower synthesis temperatures. In contrast micron-sized graphitic particles are more stable than multi-wall carbon nanotubes due to reduced curvature, and therefore become the dominant species with increasing synthesis temperatures.

Figure 8:
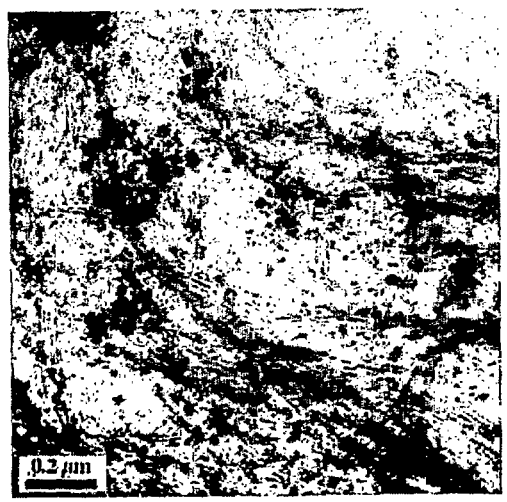
FIG. 8 is a transmission electron micrograph of multi-wall carbon nanotube product produced at a low ratio of precursor gas to material.

Amorphous carbon and nano-crystalline graphite are also produced when the carbon precursor concentration is increased (e.g., 1:1 $CH_4$:Ar) or decreased (e.g., 1:20 $CH_4$:Ar). For example, amorphous carbon is observed among the multi-wall carbon nanotubes as observed in the TEM image of FIG. 8.

The effect of carbon precursor concentration on the production of multi-wall carbon nanotubes may be a result of nucleation and kinetic considerations. That is, multi-wall carbon nanotubes nucleate on the metal particles, followed by rapid growth of the nanotubes in length as more carbon atoms are added. If the carbon driving force is too low, however, nanotube nucleation may not occur. At a higher carbon driving force more carbon nanotubes may be formed in the gas phase. The metal particles may then become coated with these carbon impurities, thereby terminating production of the multi-wall carbon nanotubes.

Raman spectroscopy was also used to evaluate the multi-wall carbon nanotubes. FIG. 9 shows the Raman spectra for the multi-wall carbon nanotubes produced according to the teachings of the invention before purification by curve 80 and after purification by curve 81. In both spectra features at ~1590 and 1355 cm-1 are observed consistent respectively with the in-plane carbon stretching mode (G-band) and a disorder-induced vibrational mode (D-band) associated with the multi-wall carbon nanotubes' finite size effects and structural defects or the presence of nanocrystalline graphite impurities. The D-band/G-band intensity (D/G) ratio in the spectrum of the as-produced multi-wall carbon nanotubes is ~0.40 indicating that these are more completely graphitized and/or contain fewer carbon impurities than CVD-generated multi-wall carbon nanotubes where the D/G ratio=1. However, it is noted that a similar and slightly smaller D/G ratio than that observed here have been observed for unpurified CVD-generated multi-wall carbon nanotubes. The G-band of the crude material in FIG. 9 is highly asymmetric as it results from three separate Raman modes with the frequencies of the two lower modes being diameter dependent. Upon purification the D/G ratio increases to −0.55 consistent with the introduction of a small number of new defects. However these new defects were not readily apparent with TEM. The change in the symmetry of the G-band in the purified material is consistent with the digestion of some of the smaller diameter and less stable multi-wall carbon nanotubes during the HNO3 reflux. Approximately, 75 wt. % of the crude material was recovered after purification indicating that the metal and ~10 wt % carbon were consumed in the acid reflux.

It is noted that the embodiments of the apparatus 10, 110, 210 may be used to produce carbon nanotubes according to the teachings of the invention. Any of the embodiments may be used to produce either single-wall carbon nanotubes or multi-wall carbon nanotubes.

EXAMPLE 1

In this Example, the carbon precursor material 14 comprised laboratory grade methane ($CH_4$) of the type that is readily commercially available from a wide range of suppliers. The process enhancement gas 22 comprised laboratory grade hydrogen ($H_2$) of the type that is also readily commercially available. The metal catalyst material 24 comprised laboratory grade ferrocene. These gaseous materials were fed into a process chamber of the type shown in FIG. 1 containing a tungsten hot wire filament 18 that was electrically connected to a DC power supply 20. A glass collection substrate (e.g., fabricated from Corning type 1737 glass) was employed as the collection substrate 32.

A static gas atmosphere was created in the process chamber by first filling the chamber with the methane carbon precursor and hydrogen process enhancement gasses. The partial pressures of the two gases was maintained at about a 1:5 ratio of $CH_4$:$H_2$ at a total pressure of 150 torr. The power supply was set to deliver 25 amperes of current at a voltage potential of 20 volts across the tungsten hot wire filament 18. The power delivered by the power supply 20 was sufficient to maintain the temperature of the hot wire filament 18 at about 2000° C. Next, a flow of ferrocene gas was initiated to bring the partial pressure of ferrocene gas in the process chamber 16 to a pressure of about 5 torr. Once the flow of ferrocene was initiated, the apparatus 10 started to produce the single-wall carbon nanotube material, which thereafter collected on the surface of the glass collection substrate 32. In this example, the temperature of the glass collection substrate was maintained at about 450° C. The apparatus was operated in this manner for about 15 minutes, which resulted in the production of about 100 mg of single-wall carbon nanotube material.

EXAMPLE 2

In this example, a 0.5 mm tungsten filament was operated between 20-30 Amps, at about 20 V and maintained at a temperature of about 2000° C. in a static gas atmosphere of 1:5 $CH_4$:$H_2$ at 150 Torr. Alternatively, a flowing $CH_4$ and Argon (20 and 100 standard cubic centimeters (SCCM), respectively) was used. A hydrogen atmosphere was used to avoid filament graphitization. Alternatively, an argon atmosphere was used and found to be preferred for the production of multi-wall carbon nanotubes. Several Torr of ferrocene were introduced into the chamber and decomposed on the hot filament, providing a gas-phase metal catalyst. The process chamber was held at 400° C. for the static gas atmosphere. Alternatively, the process chamber was held at 550 to 600° C. for the flowing gas atmosphere.

The process resulted in the production of a carbon film containing a very high density of multi-wall carbon nanotubes. Samples were prepared for transmission electron microscopy by suspending about 0.2 mg of the carbon film in 10 mL of acetone. The solutions were sonicated for about 5 minutes, and about 6 drops were placed on Ted Pella Ultrathin Carbon Type-A 400 mesh grids.

The TEM images showed a dense mat of multi-wall carbon nanotubes. Small iron catalyst particles with diameters of about 10 nm were also observed. TEM images also showed the multi-wall carbon nanotubes having an inner cavity ranging between 4-10 nm in diameter and walls several nanometers thick. Closer inspection confirmed that the walls consist of 3-15 nested single-wall nanotubes. Although both TEM and Raman spectroscopy indicated the presence of amorphous carbon and nano-crystalline graphite impurities, the multi-wall carbon nanotubes occurred at a high density.

The multi-wall carbon nanotube product were placed in a 3 M nitric acid solution at 120° C. and refluxed for about 16 hours. The purified multi-wall carbon nanotube product was recovered from the acidic solution via filtration using a hydrophilic polypropylene filter, followed by rinsing with de-ionized water and drying at about 60° C. for about one hour. The purification process removed the carbon impurities and residual metal catalyst and TGA analysis indicated that the multi-wall carbon nanotube product was greater than 99 wt % pure.

It is readily apparent that the apparatus and methods discussed herein may be used to produce large quantities of single-wall carbon nanotube material or multi-wall carbon nanotube material in the gas phase with much simpler apparatus and without being overly sensitive to certain process parameters. Consequently, the claimed invention represents an important development in carbon nanotube technology. Having herein set forth preferred embodiments of the present invention, it is anticipated that suitable modifications can be made thereto which will nonetheless remain within the scope of the present invention. Therefore, it is intended that the appended claims be construed to include alternative embodiments of the invention except insofar as limited by the prior art.

The invention claimed is:

1. A hot wire method for producing a carbon nanotube product, comprising:
   providing a process chamber having at least one filament therein;
   introducing a gaseous carbon precursor material into said process chamber for forming the carbon nanotube product;
   providing a metal catalyst material in said process chamber to catalyze the formation of the carbon nanotube product; and
   collecting the carbon nanotube product formed in said process chamber, wherein collecting the carbon nanotube product occurs from the interior walls of said process chamber.

2. The method of claim 1, wherein said step of introducing a gaseous carbon precursor material into said process chamber is conducted so that a pressure within said process chamber is maintained at a pressure of about 150 torr.

3. The method of claim 1, further comprising heating said process chamber.

4. The method of claim 1, wherein said at least one filament is maintained at a temperature of about 2000° C.

5. The method of claim 1, further comprising the step of introducing an inert gas into said process chamber.

6. The method of claim 1, further comprising the step of introducing gaseous hydrogen into said process chamber.

7. The method of claim 1, further comprising the step of introducing gaseous argon into said process chamber.

8. The method of claim 1, wherein said metal catalyst material is provided in said process chamber from said at least one filament.

9. The method of claim 1, wherein said metal catalyst material is provided in said process chamber as a gas phase organo-metallic compound.

10. The method of claim 1, further comprising purifying the carbon nanotube product after collection from said process chamber.

11. The method of claim 10, wherein purifying the carbon nanotube product is by nitric acid reflux.

12. A method for producing a multi-wall carbon nanotube, comprising:
- heating at least one interior wall of a process chamber to a temperature between about 400° C. to about 600° C.;
- contacting a gaseous carbon precursor material with at least one hot wire in said process chamber so that said at least one hot wire decomposes said gaseous carbon precursor to form elemental carbon in the process chamber; and
- contacting the elemental carbon decomposed from said gaseous carbon precursor with a metal catalyst in said process chamber to catalyze the formation of the multi-wall carbon nanotube, the multi-wall carbon nanotube collecting on the at least one interior wall of said process chamber.

13. The method of claim 12, further comprising purifying the multi-wall carbon nanotube collected on the at least one interior wall of said process chamber.

14. The method of claim 13, wherein purifying the multi-wall carbon nanotube is in 3 M nitric acid at about 120° C. for about 16 hours.

* * * * *